(12) United States Patent  
Lo (10) Patent No.: US 6,421,999 B1
(45) Date of Patent: Jul. 23, 2002

(54) MODULAR SOLID-FUEL ROCKET CHARGES WITH RIGID SUPPORT CASINGS

(76) Inventor: Roger E. Lo, Senheimer Strasse 43, Berlin (DE)

(*) Notice: Subject to any disclaimer, the term of this patent is extended or adjusted under 35 U.S.C. 154(b) by 0 days.

(21) Appl. No.: 09/700,169

(22) PCT Filed: May 18, 1999

(86) PCT No.: PCT/DE99/01517

§ 371 (c)(1),
(2), (4) Date: Nov. 8, 2000

(87) PCT Pub. No.: WO99/61774

PCT Pub. Date: Dec. 2, 1999

(30) Foreign Application Priority Data

May 22, 1998 (DE) .......................................... 198 22 845

(51) Int. Cl.$^7$ ................................................. F02K 9/08
(52) U.S. Cl. ...................... 60/255; 102/287; 102/288; 102/291; 102/374; 60/253
(58) Field of Search ................. 102/287, 291, 102/288, 374; 60/253, 255

(56) References Cited

U.S. PATENT DOCUMENTS 3,137,127 A * 6/1964 Grosse et al. ................ 60/35.3
3,176,618 A * 4/1965 Foresberg et al. ............ 102/98
3,204,560 A * 9/1965 Gustavson .................... 102/98
3,434,426 A * 3/1969 De Dapper ................. 102/100
3,713,385 A * 1/1973 Lovecy ..................... 102/28 R
3,815,507 A * 6/1974 Irish, Jr. et al. ............ 102/103
3,995,559 A * 12/1976 Bice et al. ................. 102/100
5,029,529 A * 7/1991 Mandingo et al. ....... 102/202.7
6,036,144 A * 3/2000 Sisk .......................... 102/374

FOREIGN PATENT DOCUMENTS

| DE | 976 057 | 1/1963 |
| DE | 198 22 845 A1 | 12/1998 |
| FR | 1114843 | * 4/1956 |

* cited by examiner

Primary Examiner—Charles G. Freay
Assistant Examiner—John F Belena
(74) Attorney, Agent, or Firm—Herbert Dubno; Andrew Wilford (57) ABSTRACT

A modular solid-fuel rocket propellent charge has a combustion-chamber wall, a plurality of separate elements including frozen fuel or oxidizer, and respective rigid casings completely surrounding and enclosing the elements. Respective formations on the casing and on the casings directly engage each other for supporting the elements via the respective casings directly an the wall.

6 Claims, 9 Drawing Sheets

MODULAR SOLID-FUEL ROCKET CHARGES WITH RIGID SUPPORT CASINGS

The invention relates to modular solid-fuel rocket propelling charges with different propellant components and other components, for instance fuel, oxidants, energy-enhancing admixtures, binders, additives, coatings, inhibitors, etc., which can be completely or partially fragmented, i.e. not in the form of the conventional homogeneous mixture, but in the form of one or more macroscopic combustible elements having any suitable configuration, whereby all or single components can also consist of substances which have first to be brought to a sufficiently solid state through cooling.

Thereby the invention relates to the technical field of rocket propellants and their production, construction and safe storage of solid-fuel propellant charges. In this connection the term solid-fuel propelling charges defines the simple or composite propellant block existing in a certain geometric shape, including possible inserts or attachments which are mounted for various purposes and are mostly consumed through combustion.

It is state of the art in this type of solid-fuel rocket propelling charges according to the patent application DE 197 56 794 A1 of the applicant dated Dec. 19, 1997 that the propellant charge be at least partially fragmented, i.e. at least one of the components is not present in the conventional intimate mixture with the other components, but is present in the form of one or more macroscopic combustible elements with any suitable geometric configuration. The combustible elements are chemically insulated from each other by means of appropriate coatings, and if necessary, can be at the same time mechanically interconnected. Furthermore through a special selection of their composition, the combustible elements can be suited to serve as modules with different functions, such as ignition, combustion promoters, gas production, etc. The combustible elements can have particularly the shape of disks, whose outer surface accommodates the contour of the rocket combustion chamber, while inside-they can have one or several bores with a suitably shaped cross section surface, which due to their arrangement in sequence form one or more combustion channels with constant or variable cross section surface, or they can be lodged with various, freely selectable cross section shapes in a coherent matrix of the respective other fuel component, for instance oxidant-rich elements completely or partially embedded in a fuel matrix.

It is state of the art in conventional, i.e. storage-capable solid-fuel propellants to arrange the propellant components in layers, in so-called "sandwich propellants", however this has not resulted in particular advantages and therefore has not been widely used.

Cryogenic solid bodies as propellants have been tested at the USAF Phillips Lab (Edwards) since 1994 in a "High-energy Density" program. In 1997 papers relating to hybrids (i.e. propellants with liquid and solid fuel components with frozen hydrocarbons as solid component have been published (see C. Larson, USAF-Phillips Lab, 3rd AIAA/ASME/SAE/ASEE Joint Propulsion Conference and Exhibit, Washington State Convention and Trade Center, Seattle, Wash. Jul. 6–9, 1997, AIAA-96-3076).

This known state of the art is fraught with the problem that modular, cryogenic solid-fuel propellant charges require constant cooling in order to maintain their aggregate state in a normally tempered surrounding. In the absence of cooling, these propellant charges can melt, evaporate, so that in many ways this can trigger the development of very dangerous situations.

It is the object of the invention to make available modular solid-fuel rocket propelling charges of the kind mentioned in the introduction, so that the development of dangerous situations due to cooling failure while the output of the carrier rocket increases, is drastically reduced.

This object is achieved in modular solid-fuel rocket propelling charges of the aforementioned kind having the characteristic features of claim 1.

Advantageous embodiments are defined in the dependent claims.

Depending on the combination of the features defined in claim 1 with the advantageous embodiments of the invention defined in the dependent claims, the situation can be considerably improved with regard to all or some of the indicated problems. The modular solid-fuel rocket propelling charge makes possible the selection of fuel and oxidants from a wide variety and can be separately formed into combustible elements, which combined can result in the desired propellant geometry. The therefor required aggregate state is, if needed, produced and maintained through a corresponding cooling. The term "fragmented propelling charge" (here synonymous with "modular", "separated", or "divided" propellant charge) refers primarily to the separation of the main components (fuel and oxidant). An appropriate synonym for "modular solid-fuel rocker propelling charge" is "multiple internal hybrid propulsion".

According to the invention the following advantageous effects can be achieved:

The propellant charges of the invention simplify considerably the production of solid fuel propellant charges. Many dangerous procedures are avoided, production in series is made affordable. Considerable cost reductions can be expected. These statement are valid, independent of possible complications which can be caused by cryogenic solid substances.

The propellant charges of the invention avoid the large phase border surfaces of conventional propellant charges. As a result in the case of propellants suitable for warm storage an increase of the long-term storage capability is to be expected, besides the combustible elements can be separated from each other by insulating foil.

Cryogenic fuels can not be stored, but are less reactive than the warm ones due to the low temperatures. In certain cases this can make possible the use of special high-energy substances, which would be to reactive as liquids or gases. The propellant charges of the invention allow any fuel combination to be realized as a monergol solid-fuel propellant. This reaches from storageable or cryogenic liquid monergol and diergol propulsion systems over hybrid and quasi-hybrid propulsion systems, suspension (slurry) propulsion systems and tribrids up to all triergols. Therefore drastic increases of the $I_{sp}$ (theoretical specific impulse) can be expected, not only compared to the conventional solid-fuel propellants, but even compared to the state of the art liquid propulsion systems (see here R.E.LO:DFVLR-Stuttgart: "Chemische Wasserstoffaufheizung durch tribride Verbrennung", Chemie-Ingenieur-Technik (1967)39, volume 15, pages 923–927/R.E.LO: Technical Feasibility of Chemical Propulsion Systems with very high Performance, Proceedings of the XVIIIth Astronautical Congress, Belgrade, Sep. 25–29, 1967, pp. 121–132/R.E.LO, DFVLR-Lampoldshausen: Theoretische Leistungen des Raketentriebstoffsystems $F_2,O_2$/LiH, Al/$H_2$ und einfacher Teilsysteme", DLR Mitt. 69-21 (December 1969)/R.E. LO, DFVLR Lampoldshausen: "Chemische Wasserstoffaufheizung durch Verbrennung von Aluminium mit Sauerstoff oder FLOX", DLR-Mitt. 70-03 (February 1970)/R.E.LO, DFVLR Lampoldshausen: "Quasihybride Raketenantriebe", Raumfahrtforschung, Vol. 4, April 1970).

The propellant charges of the invention make possible to create solid propellant charges which are as environmentally friendly as possible, through an appropriate selection of fuels, for instance solid hydrogen/solid oxygen.

In the following the invention is closer described in several embodiments with reference to the drawing. I
It shows:

FIG. 1 a section through a combustible element of a hollow-cylinder propellant charge according to the invention, FIG. 2 the fastening of the solid-fuel propellant by means of traction-resistant elements, FIG. 3 the standard solution for the rigidity reinforcement of the propellant charge of the invention, FIG. 4 a further variant of a casing support, FIG. 5 a variant of the fastening of the traction-resistant element with a plug-in mounting, FIG. 6 a representation of a double-walled casing of hollow-cylinder rings with a duct system for cooling formed by straps, FIG. 7 a representation of a double-walled casing of hollow segments with a pipe system for cooling formed by straps, FIGS. 8 and 9 a single-walled casing with attached cooling coil duct and FIG. 10 a drainage system (fill-drain system) of the casing.

All and/or individual modules of the propellant charges of the invention are surrounded by a casing chemically compatible with the fuel, of sufficient strength and chemical compatibility.

Figure 1:
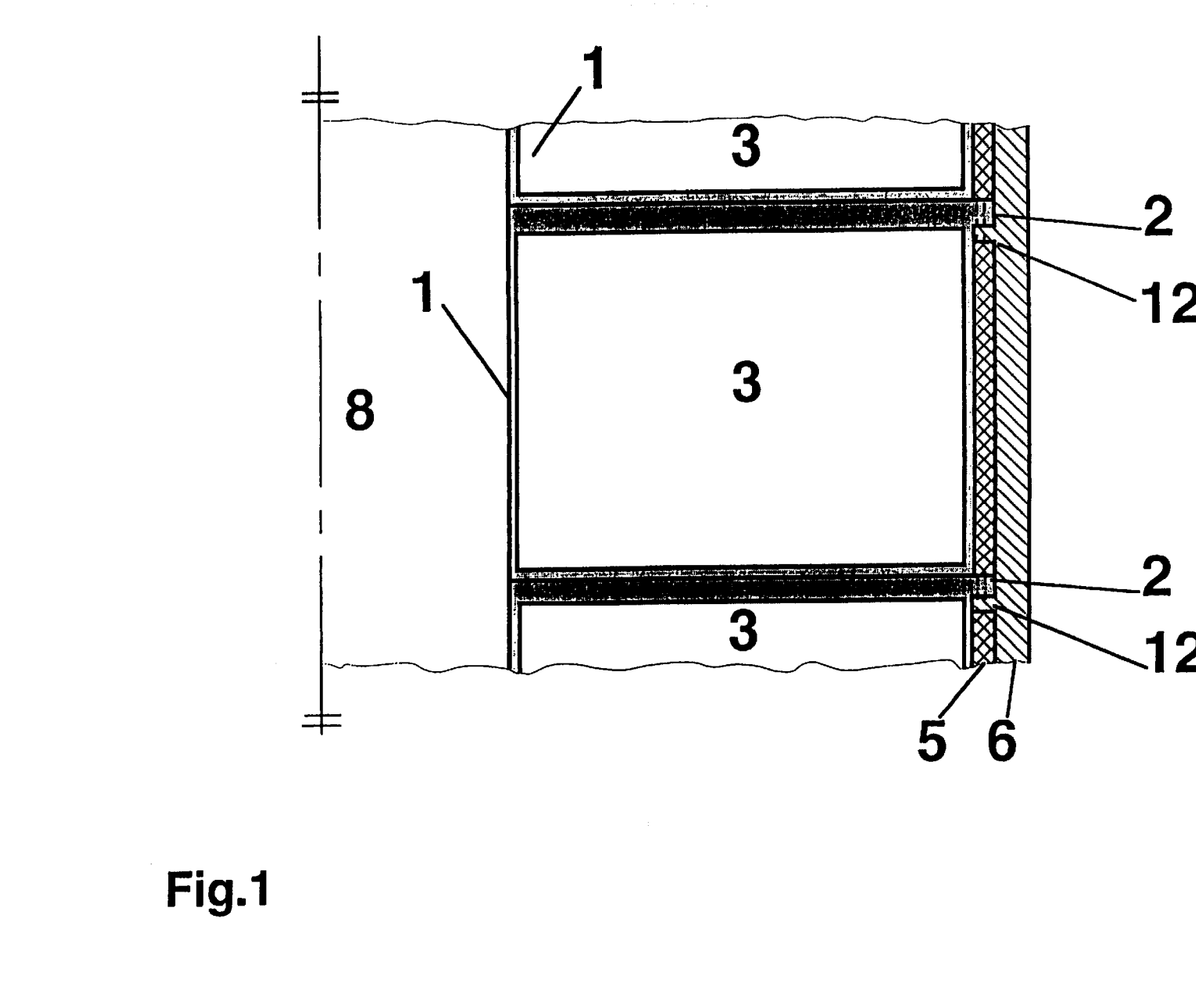
Figure 4:
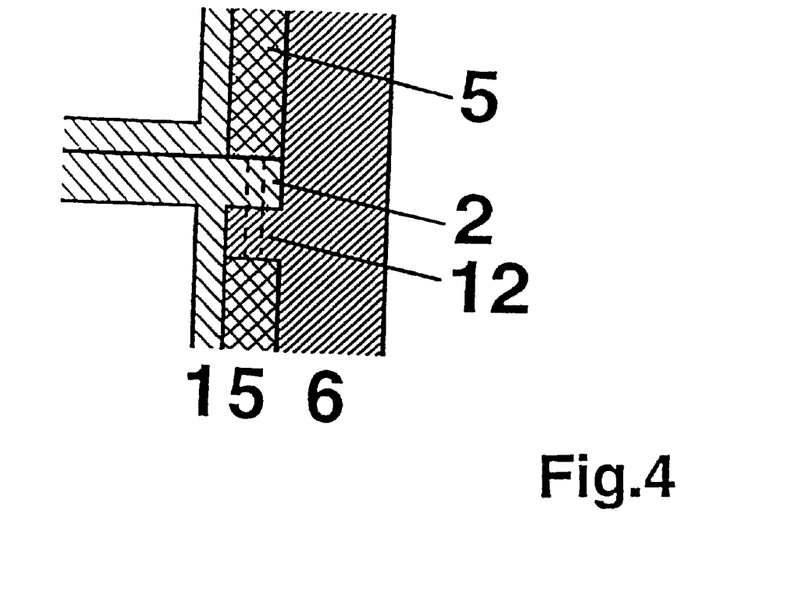

FIG. 1 shows a section through a combustible element of a hollow-cylinder propellant charge. The casing 1 surrounds the propellant 3. In this embodiment example it is composed of cylindrical and annular surfaces, which during manufacturing are for instance cemented to each other (manufacturing processes are here not further described). A projecting rim of the casing 1 forms a support 2 for the combustible element, which rests on a support 12 of the combustion-chamber wall 6 and is fastened to the same by screws (see also FIG. 4).

According to another embodiment example, this support 2 can just as well be located differently from FIG. 1 at the lower end of the module. By inserting a mounting ring 11 (see FIG. 3) the support at both ends of the cylindrical modules is achieved.

During the ignition of the encased propellant charges an igniter (e.g. generated from a module located at the head end of the combustion chamber, consisting of a self-igniting solid-fuel mixture) burns off at first the part of the casing 1 forming the surface of the combustion channel 8. This process runs continuously without interruption with evaporation and ignition of the alternating module of oxidant and fuel. It is evident that on the one hand the casing 1 has to be as thin as possible, and on the other hand as thick as necessary. Besides the frontal surfaces of the casing 1 which face the border layer flame in the combustion channel 8 should have as much as possible the same burning rate as the fuels 3, which can be influenced slightly through the selection of the material. Geometric shapes of the fuel wherein the inside of the combustion-chamber wall 6 is exposed to the flame for different time periods (e.g. conocylindrical burner or front burner require also an inner heat protection layer.

During assembly a difference has to be made between segmented and nonsegmented combustion chambers. The former require a certain sequence. Under certain conditions, each module can form at the same time a combustion-chamber segment. Fuel, casing, suspension, insulation and combustion-chamber segments can then be prepared simultaneously. However as a rule the core will have to be built up from the bottom to the top. The represented problematic is very specific to the example. Special and any desired geometric shapes result from the targeted thrust-time curve of the propulsion mechanism at simultaneous high filling rate. Naturally it always applies to all shapes that they have to be capable of being assembled together with casings, insulation layers, suspensions, etc.

Figure 2:
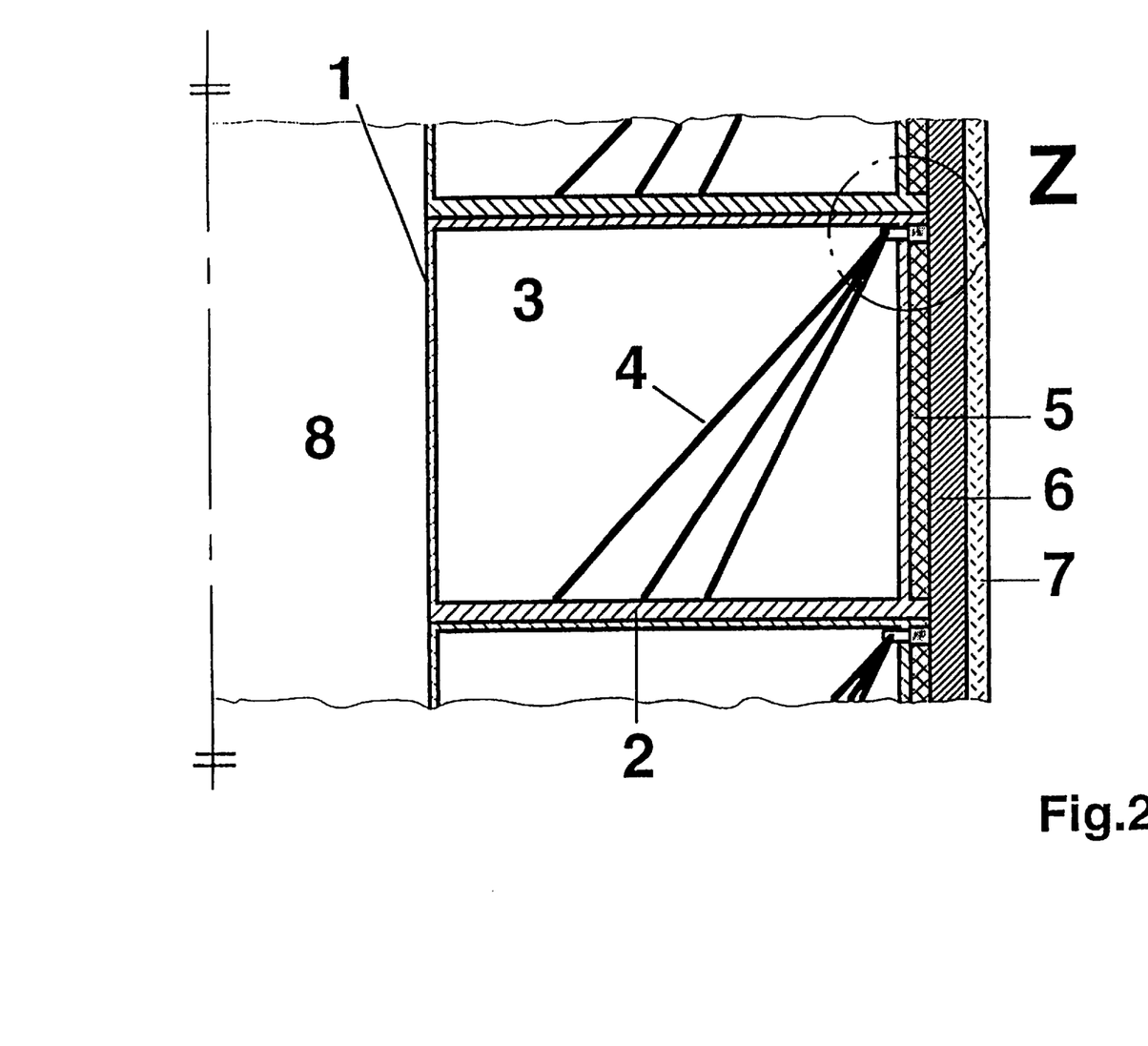

The brittleness of ice blocks can be a problem, particularly in the case of dynamic loads. As a solution the use of pressure-metamorphic ice crystals can be considered, which in a composite are much less brittle (difference between snowball and icicle). While snow blocks made of frozen water can be subjected to considerable load (the igloo principle), in the case of frozen propellant this can be different. The strength requirements can be strongly reduced through fastening to the combustion-chamber wall 6. Then in the conditions of flight acceleration, the propellant block does no longer have to carry all superimposed elements, but has only to preserve its own compactness. For such solid fuels FIG. 2 shows a variant of the fastening with tension wires 4, which has the advantage that fewer materials different from the propellant material have to be added to the casing material, which changes the gross composition of the fuel core. By contrast FIG. 3 shows a standard solution for the reinforcement 9 of a box, which would be easier to mount, but would add further surfaces of casing material.

Figure 5:
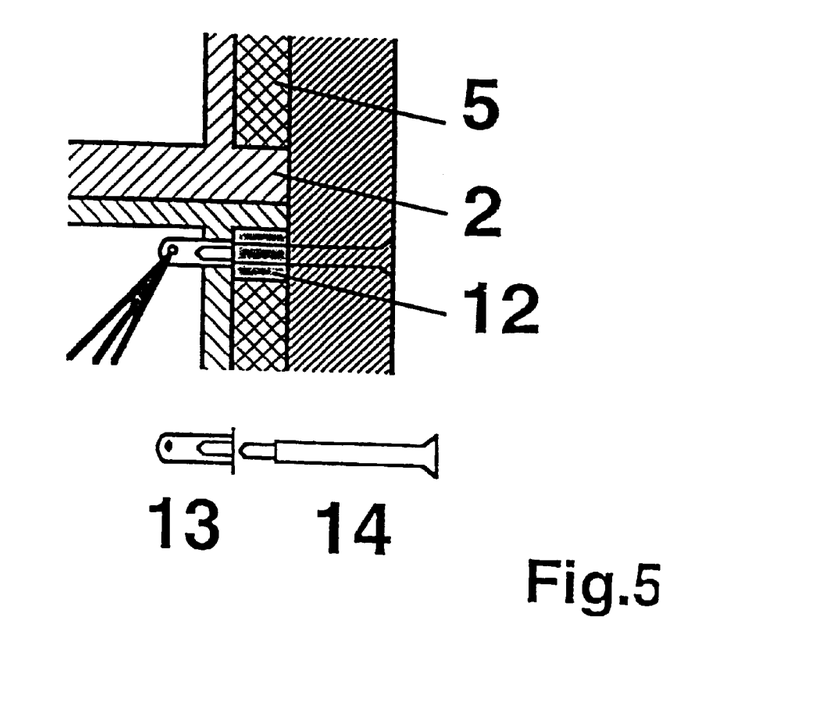

In the selection of the number and arrangement of the tension wires 4, it has to be considered that these will burn off as soon as the combustion surface reaches them. The assembly takes place so that at first the wires 4 affixed to the bottom plate by suitable means (not illustrated) are connected with a plug-in mounting 13 (see FIG. 5) which is sealed off and located directly in the outer surface of the casing 1 and is protected against twisting by means of a suitable configuration. During filling and closing of the propellant element they are embedded together with the same in the propellant 3. After the insertion of the combustible element in the combustion chamber (or in its combustion-chamber segment), the whole thing is fixed from the outside by tight socket screws 14. Seals and other detail are here not closer described. A possibly required heat-protection layer (see TPS 7 in FIG. 2) can be retrofitted in this case.

Figure 3:
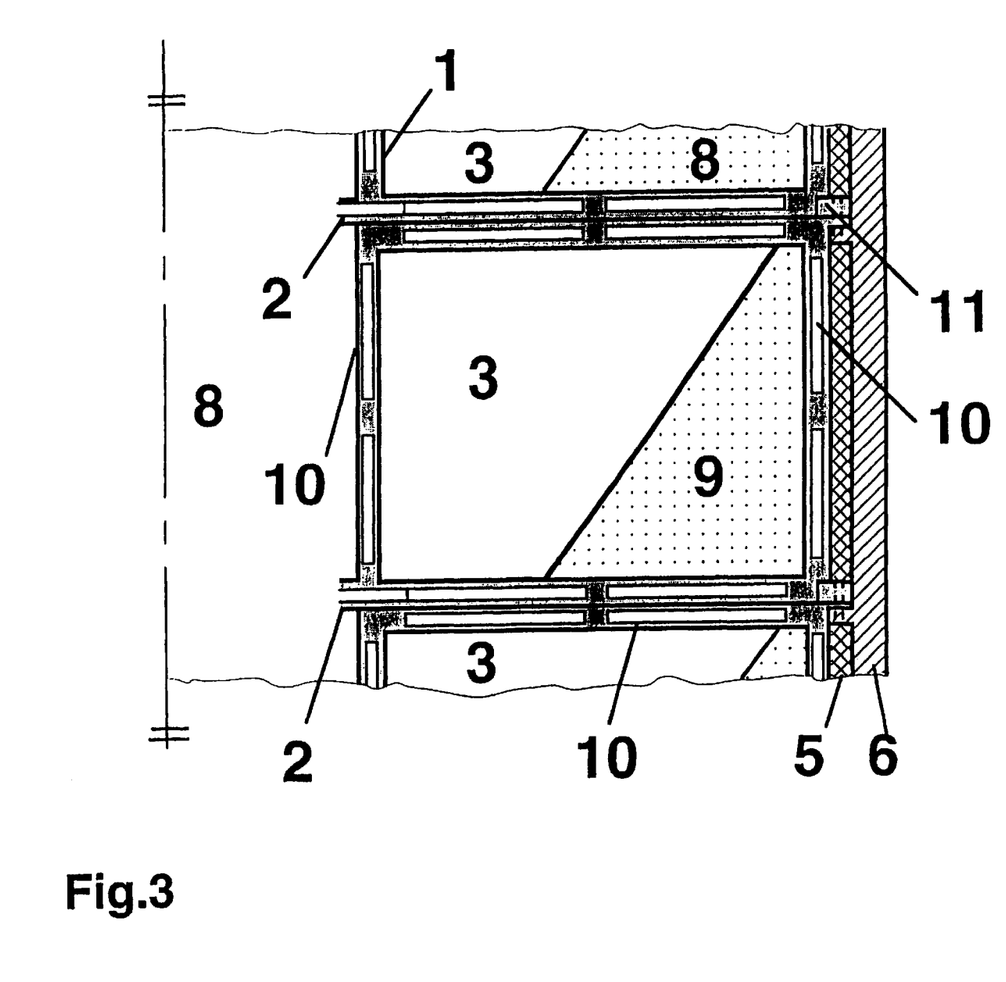
Figure 6:
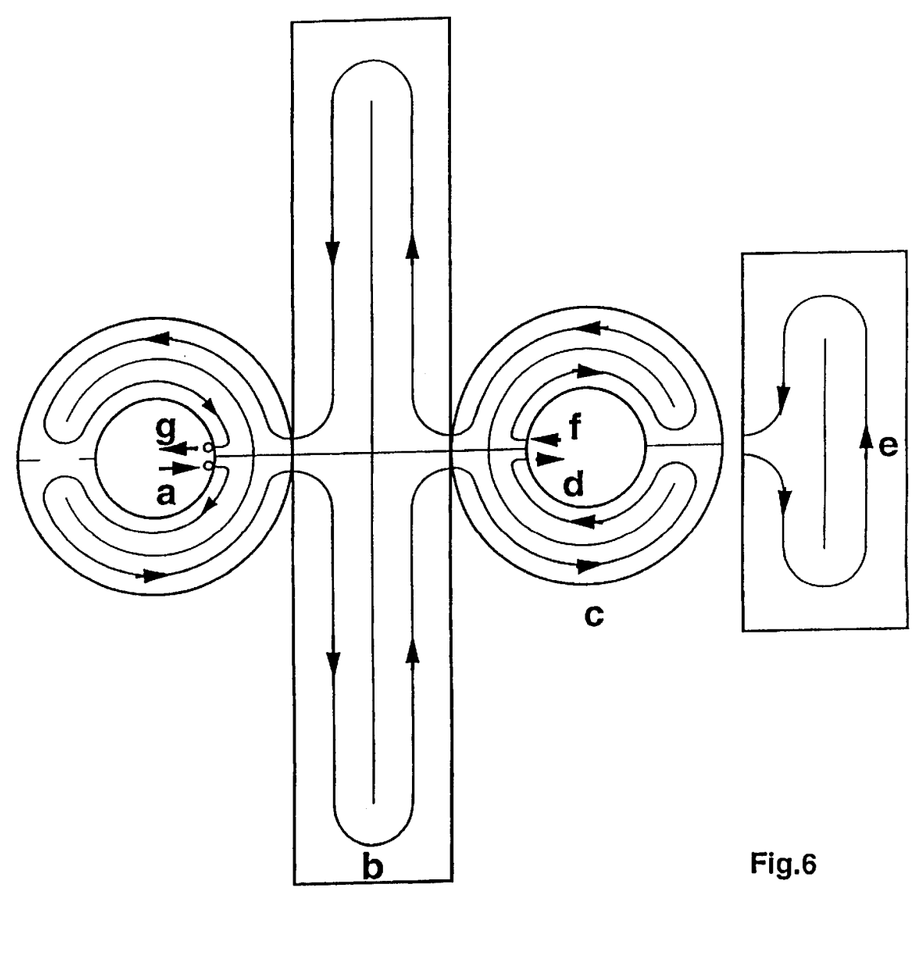
Figure 7:
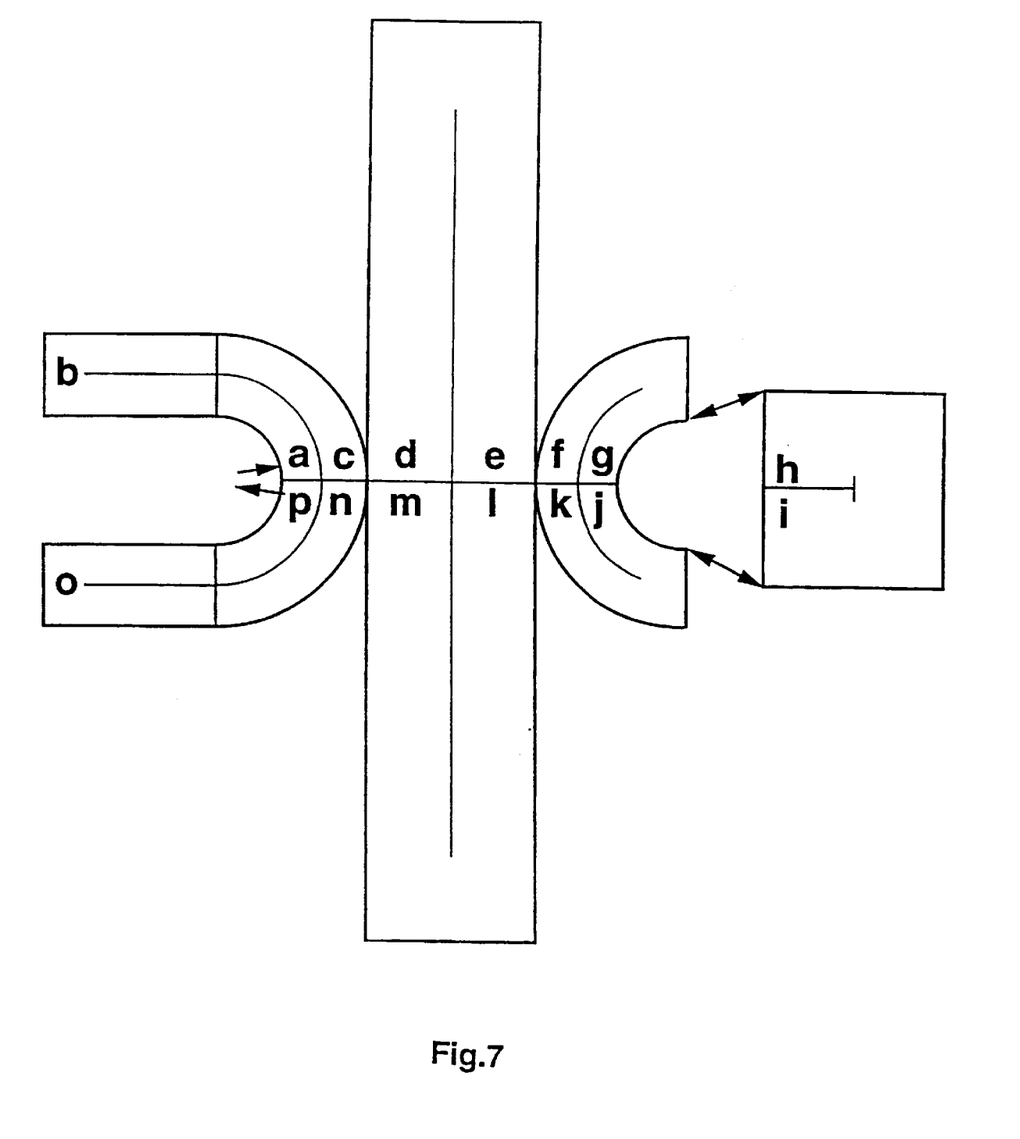

According to a further embodiment example, such as represented in FIG. 3, coolable casings can be made with a double walling. The individual casing surfaces are there traversed by cooling channels 10, so that each propellant element has at least one inlet and one outlet. The walls made of hollow cylinder rings (see FIG. 7) can be always provided with one or more straps running parallelly to the outer circumference, which sit between the double walls as spacers and form the inner border of channels 10. The flow of the cooling medium takes place according to the alphabetical marking from a to g in FIG. 6 or from a to p in FIG. 7.

Figure 8:
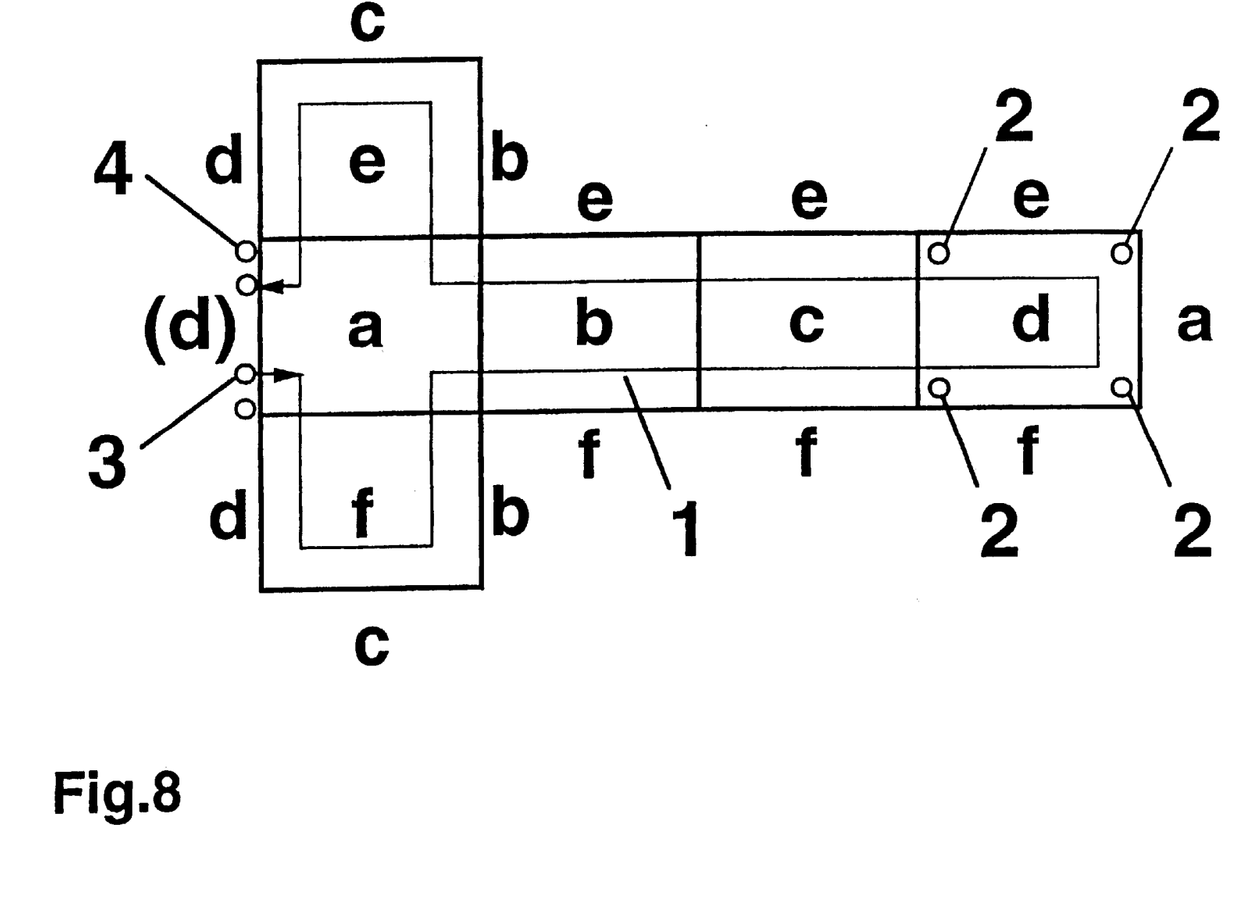
Figure 9:
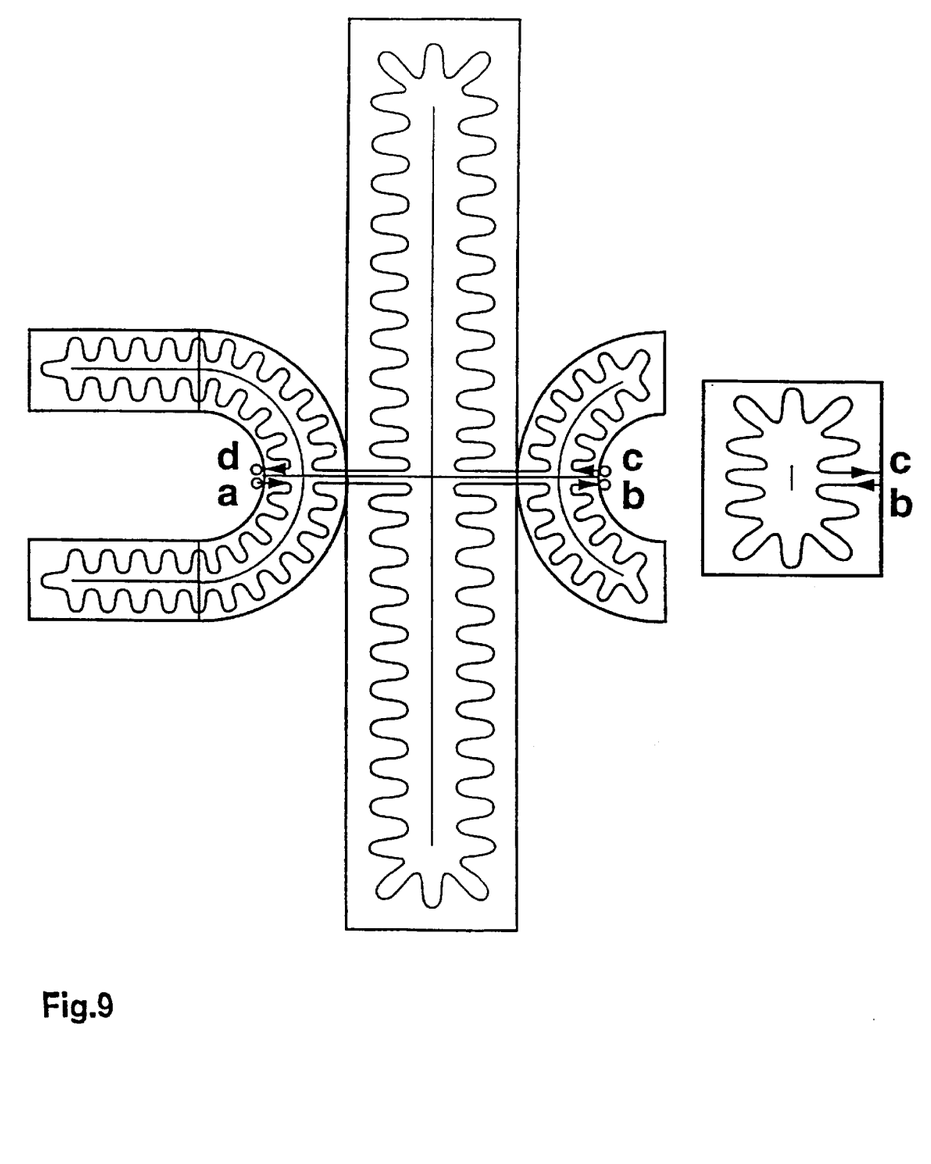
Figure 10:
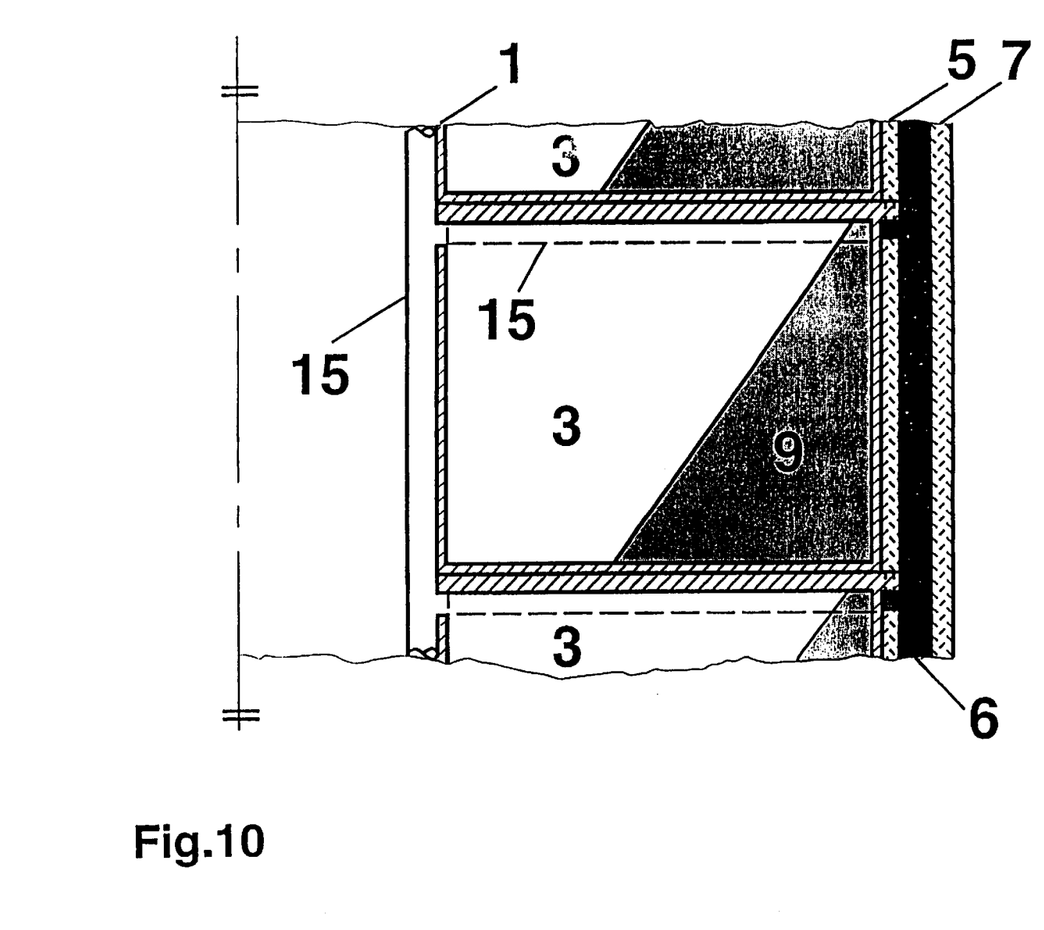

On simple casing walls cooling coil ducts can be mounted (see FIGS. 8 and 9). In both cases the internal channel or duct system (the flow corresponding to the alphabetical markings in FIGS. 8 and 9) is connected with feeding ducts outside the casing, which can be passed through the combustion channel and nozzle, or through the combustion-chamber wall. In both cases snap closures are required, such as used in liquid rockets. In the case of access through the wall, the latter has to be sufficiently pressure-resistant. Similar conditions apply to the feeding system of the fill-drain system 15 (see FIG. 10). However, the feeding and discharge ducts of this system are connected only with the highest and/or lowest located parts of an encased volume. FIG. 10 shows a drainage system through which the initial gas filling (e.g. helium) can exit, while liquid propellant flows in through a similar inlet passage (not shown).

The illustrated dimensions of the ducts are without significance, just like the dimensions of all the other details shown in the drawing. The heat elimination through the cooling system is the step which determines the freezing speed of the propellant, the heat supply through the combustion channel and the outer insulation of the same during their slow defrosting. Therefore the fill-drain system can use ducts with small cross sections. This is advantageous, since the entire system together with the cooling system are burned off during the operation of the motor. In the simplest case each combustible element need to have its own connection to the filling system, because a connection in series (of course always separated as to fuel and oxidant) could not be without problems. However, under certain conditions the serial filling could be conceivable with some very simple measures. For instance the hollow cylinder rings positioned at highest, respectively lowest points, which in the here described embodiment example are in an inclined position could be interconnected. This way the filling system ends at the uppermost element with an outlet at the point which in a tilted position would be the highest.

In opposition thereto the drainage system shown in FIG. 10 connects with a single outlet and one connection for each all the propellant elements and separated therefrom all oxidant elements. It functions in the vertical position of the motor, serves only for drainage during defrosting and has to be closed during filling with serial feeding.

The procedure described here should not exclude the possibility of modular production of the combustible elements, to be produced individually in separate special devices, then to be integrated in the combustion chamber into a core, or in the case of segmented construction, to be integrated into the combustion chamber. If the integration procedure does not allow otherwise, the described ducts have to be assembled in a suitable way through connections.

It is common to all examples that they are conceived only as solution examples serving for the clarification of the principles.

List of Used Reference Numerals
1 casing
2 support
3 propellant
4 suspension/tension wire/traction-resistant elements
5 wall lining/heat-protection layer
6 combustion-chamber wall
7 TPS/heat-protection system/
8 combustion channel
9 reinforcement
10 cooling channels/duct system
11 mounting ring
12 support
13 plug-in holder
14 socket screw
15 fill-drain
a–p flow direction

What is claimed is:

1. A modular solid-fuel rocket propellent charge comprising:

a combustion-chamber wall;

a plurality of separate elements including frozen fuel or oxidizer;

respective rigid casings completely surrounding and enclosing the elements; and respective formations on the casing and on the casings directly engaging each other for supporting the elements via the respective casings directly on the wall.

2. The modular solid-fuel rocket propellant charge defined in claim 1 wherein the formations include outwardly projecting rims formed on the casings and inwardly projecting supports formed on the wall.

3. The modular solid-fuel rocket propellant charge defined in claim 1 wherein the formations include screws projecting through and anchored in the wall and engaged in the casings.

4. The modular solid-fuel rocket propellant charge defined in claim 1 wherein the formations include cables each having one end fixed to the wall and an opposite end fixed to a respective one of the casings.

5. The modular solid-fuel rocket propellant charge defined in claim 1 wherein the casings are hollow and the charge further comprises means for circulating a coolant through the casings.

6. The modular solid-fuel rocket propellant charge defined in claim 1 wherein the casings forming vent ducts through which gas can escape.

* * * * *